(12) United States Patent
Yeames (10) Patent No.: US 8,397,350 B2
(45) Date of Patent: Mar. 19, 2013

(54) FASTENING METHOD AND APPARATUS (75) Inventor: James E. Yeames, Newport, NC (US)

(73) Assignee: Line Control Systems, LLC, Dover, NH (US)

( * ) Notice: Subject to any disclaimer, the term of this patent is extended or adjusted under 35 U.S.C. 154(b) by 128 days.

(21) Appl. No.: 12/900,125

(22) Filed: Oct. 7, 2010

(65) Prior Publication Data

US 2011/0079173 A1    Apr. 7, 2011

Related U.S. Application Data

(60) Provisional application No. 61/249,316, filed on Oct. 7, 2009.

(51) Int. Cl.
*B63B 21/04* (2006.01)
(52) U.S. Cl. ........ 24/129 R; 114/218; 114/230; 114/364
(58) Field of Classification Search ................ 24/129 R, 24/115 R, 129 A, 115 K; 114/218, 230.26, 114/364, 223; 256/1, 65.11, 65.05
See application file for complete search history.

(56) References Cited

U.S. PATENT DOCUMENTS

| | | | | |
|---|---|---|---|---|
| 1,694,312 | A * | 12/1928 | Clark | 114/218 |
| 3,454,252 | A * | 7/1969 | Pearson et al. | 248/511 |
| 6,626,406 | B1 * | 9/2003 | Olson, Jr. | 248/219.3 |
| 7,302,900 | B1 * | 12/2007 | Stefano | 114/218 |
| 7,520,233 | B1 * | 4/2009 | Lyon | 114/218 |
| 2005/0273982 | A1 * | 12/2005 | Sclalfani | 24/115 R |
| 2008/0087211 | A1 * | 4/2008 | Sutherland et al. | 114/364 |

* cited by examiner

*Primary Examiner* — James Brittain
(74) *Attorney, Agent, or Firm* — Christopher & Weisberg, P.A.

(57) ABSTRACT

A fastening device includes a tube defining a first axis, a tube first end, a tube second end, and a through hole, the through hole defining a first opening and a second opening, a second axis of the through hole being substantially perpendicular to the first axis of the tube, the tube second end of the tube securing rigidly to an attaching device. The fastening device also includes a cord inserted through the through hole, the cord defining a cord first end and a cord second end, the cord first end disposed on a side of the through hole corresponding to the first opening, the cord second end disposed on a side of the through hole corresponding to the second opening. The cord first end is looped over the tube first end of the tube.

19 Claims, 8 Drawing Sheets

102 PROVIDE A TUBE, THE TUBE DEFINING A FIRST AXIS, A TUBE FIRST END, A TUBE SECOND END, AND A THROUGH HOLE, THE THROUGH HOLE DEFINING A FIRST OPENING AND A SECOND OPENING, A SECOND AXIS OF THE THROUGH HOLE BEING SUBSTANTIALLY PERPENDICULAR TO THE FIRST AXIS OF THE TUBE, THE TUBE SECOND END OF THE TUBE SECURING RIGIDLY TO AN ATTACHING DEVICE

104 INSERT INSERTING A CORD THROUGH THE THROUGH HOLE OF THE TUBE, THE CORD DEFINING A CORD FIRST END AND A CORD SECOND END, THE CORD FIRST END DISPOSED ON A SIDE OF THE THROUGH HOLE CORRESPONDING TO THE FIRST OPENING, THE CORD SECOND END DISPOSED ON A SIDE OF THE THROUGH HOLE CORRESPONDING TO THE SECOND OPENING

106 LOOP THE CORD FIRST END OVER THE TUBE FIRST END OF THE TUBE

108 PLACE A LOAD ON THE CORD SECOND END TO HAVE A FIRST SEGMENT OF THE CORD FIRST END PINCH A SECOND SEGMENT OF THE CORD FIRST END AGAINST THE TUBE AND LOCK THE CORD IN PLACE

Fig. 8

FASTENING METHOD AND APPARATUS

CROSS REFERENCE TO RELATED APPLICATIONS

This patent application claims the benefit of U.S. Provisional Patent Application No. 61/249,316 filed on Oct. 7, 2009, entitled, "A DEVICE TO ALLOW THE SAFE FASTENING AND INDEPENDENT ADJUSTMENT OF A LINE OR LINES TO A SINGLE FIXED OR REMOVABLE ATTACHMENT POINT SUCH AS A ROD HOLDER ON A BOAT", the contents and teachings of which are hereby incorporated by reference in their entirety.

BACKGROUND OF THE INVENTION

1. Field of the Invention

The present invention relates generally to boat fasteners. In particular, the invention relates to a device to allow the safe fastening and independent adjustment of single or multiple ropes or lines from a single attachment point such as a rod holder.

2. Description of the Prior Art

In boating, there are many occasions where things need to be tied to a boat. Traditionally, cleats have been used as an interface for tying things the boat. A traditional cleat attaches to a flat surface (e.g., deck of a boat) or a spar and features two "horns" extending parallel to the surface or the axis of the spar. Many boats feature cleats at the bow (to which an anchor line or forward dock line is tied) and at the stern (to which a dinghy tow line or aft dock line is tied). A further use of cleats is to attach auxiliary devices such as fenders or fender boards which provide protection for the hull and sides of the boat.

A cleat hitch is a special knot used to secure a line (e.g., rope) to a cleat. To tie a cleat hitch, first, bring the line under load past the center of the cleat on the outside, and wrap it around under both horns. Next, bring the line across and back under the first horn again in a figure-eight. Then make another figure-eight loop around the second horn. Finally, pass the loose end of the line, called the bitter end, under itself such that an increasing strain on the line will pull the knot tighter rather than loosening it.

Other methods of securing a rope to a boat involve the use of hooks or clips. A variety of different kinds of knots may be used to secure a rope to hooks or clips.

SUMMARY OF THE INVENTION

Unfortunately there are deficiencies to the above described conventional methods of securing things to a boat. For example, a single cleat is often be used for the attachment of more than one line or rope. If a user wishes to adjust an underline, he is forced to first remove the top line which may result in an unsafe condition or damage to the hull sides.

Another deficiency to the above described conventional methods for securing things to a boat is that cleat hitches are difficult to tie. Novice boaters, and even some experts, can unknowingly make a mistake when tying the cleat hitch. Such a mistake may not be immediately recognized by visually examining the knot. However, a mis-tied cleat hitch is substantially weaker than a correctly tied cleat knot and may lead to the catastrophic failure of the hitch becoming undone.

Another deficiency to the above described conventional methods for securing things to a boat is that properly tied cleat hitches are non adjustable without untying. The load that is pulling on the rope may be very large. A properly tied cleat hitch may hold this load in place, but if a user wishes to pull this load closer, he would have to untie the hitch and may not be able to withstand the load on the rope by himself while attempting to retie the hitch.

In contrast to the above described conventional methods for securing things to a boat, an improved method includes providing a first tube having a second tube passing substantially perpendicular to an axis of the first tube. The method also includes passing a rope through the second tube and looping the rope over the first tube so that the rope pinches itself against first tube opposite the load. The tube within a tube structure is inexpensive to produce and may be deployed in a wide variety of locations around the boat. Additionally, by looping the rope around the first tube to pinch itself against the first tube, the improved securing method allows for the rope to securely hold fast when pulled from one side of the second pipe and smoothly slide when pulled from the other side of the second pipe. This allows a user to adjust the operable length of the rope without untying it from the pipe within a pipe structure.

For example, one embodiment is directed to a fastening device. The fastening device includes a tube defining a first axis, a tube first end, a tube second end, and a through hole, the through hole defining a first opening and a second opening, a second axis of the through hole being substantially perpendicular to the first axis of the tube, the tube second end of the tube securing rigidly to an attaching device. The fastening device also includes a cord (e.g., line, rope, etc.) inserted through the through hole, the cord defining a cord first end and a cord second end, the cord first end disposed on a side of the through hole corresponding to the first opening, the cord second end disposed on a side of the through hole corresponding to the second opening. The cord first end is looped over the tube first end of the tube. When pulling from the cord second end, a first segment of the cord first end is constructed and arranged to pinch a second segment of the cord first end against the tube to lock the cord in place. When pulling from the cord first end, the cord is constructed and arranged to move through the through hole in a direction from the second opening to the first opening.

DETAILED DESCRIPTION OF THE PREFERRED EMBODIMENT

The preferred embodiment(s) of the present invention is illustrated in FIGS. 1-8.

An improved method of fastening includes providing a first tube having a second tube passing substantially perpendicular to an axis of the first tube. The method also includes passing a rope through the second tube and looping the rope over the first tube so that the rope pinches itself against first tube opposite the load. The tube within a tube structure is inexpensive to produce and may be deployed in a wide variety of locations around a boat. Additionally, by looping the rope around the first tube to pinch itself against the first tube, the improved securing method allows for the rope to securely hold fast when pulled from one side of the second pipe and smoothly slide when pulled from the other side of the second pipe. This allows a user to adjust the operable length of the rope without untying it from the pipe within a pipe structure.

Figure 1:
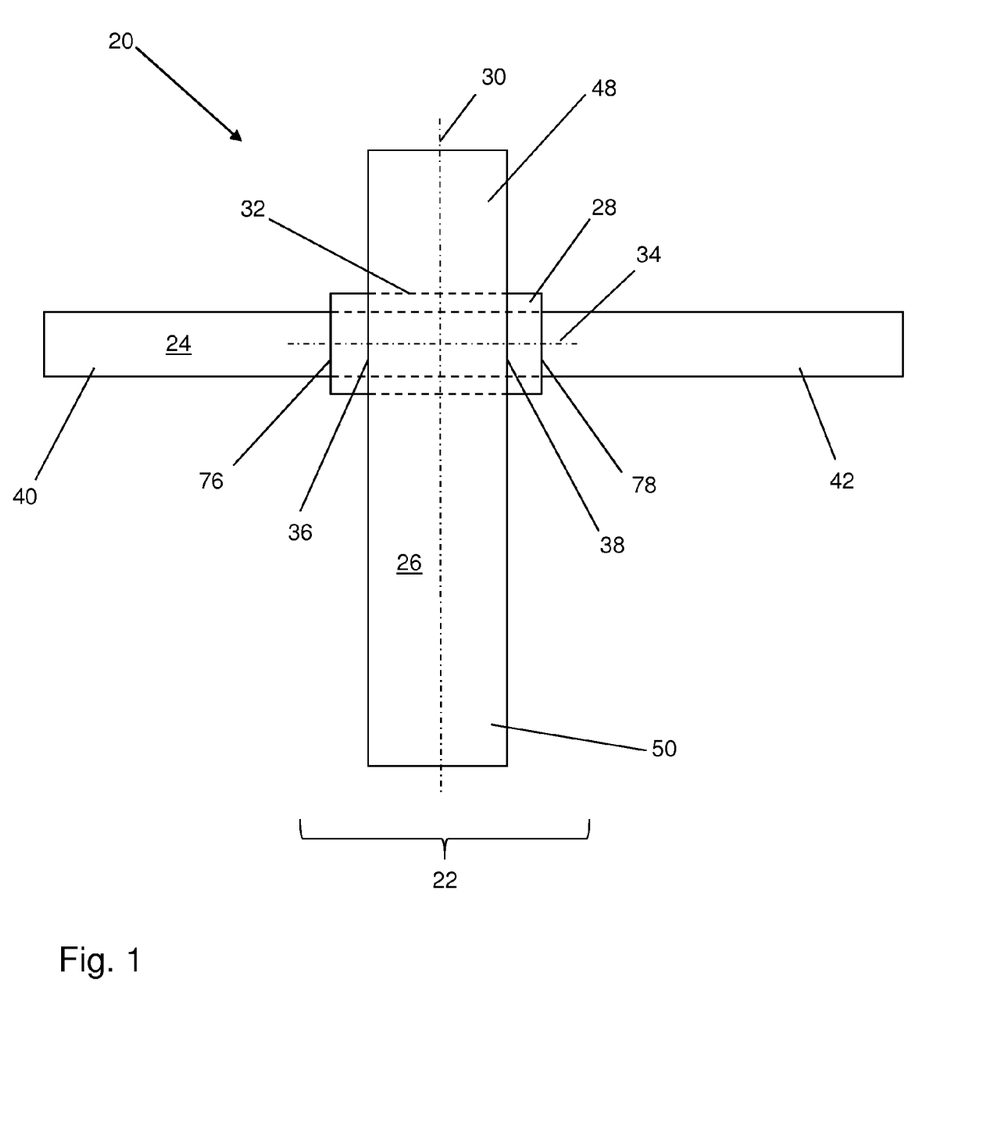
FIG. 1 is a front view of a fastening device being assembled, the fastening device having a tube assembly and a cord.
Figure 2:
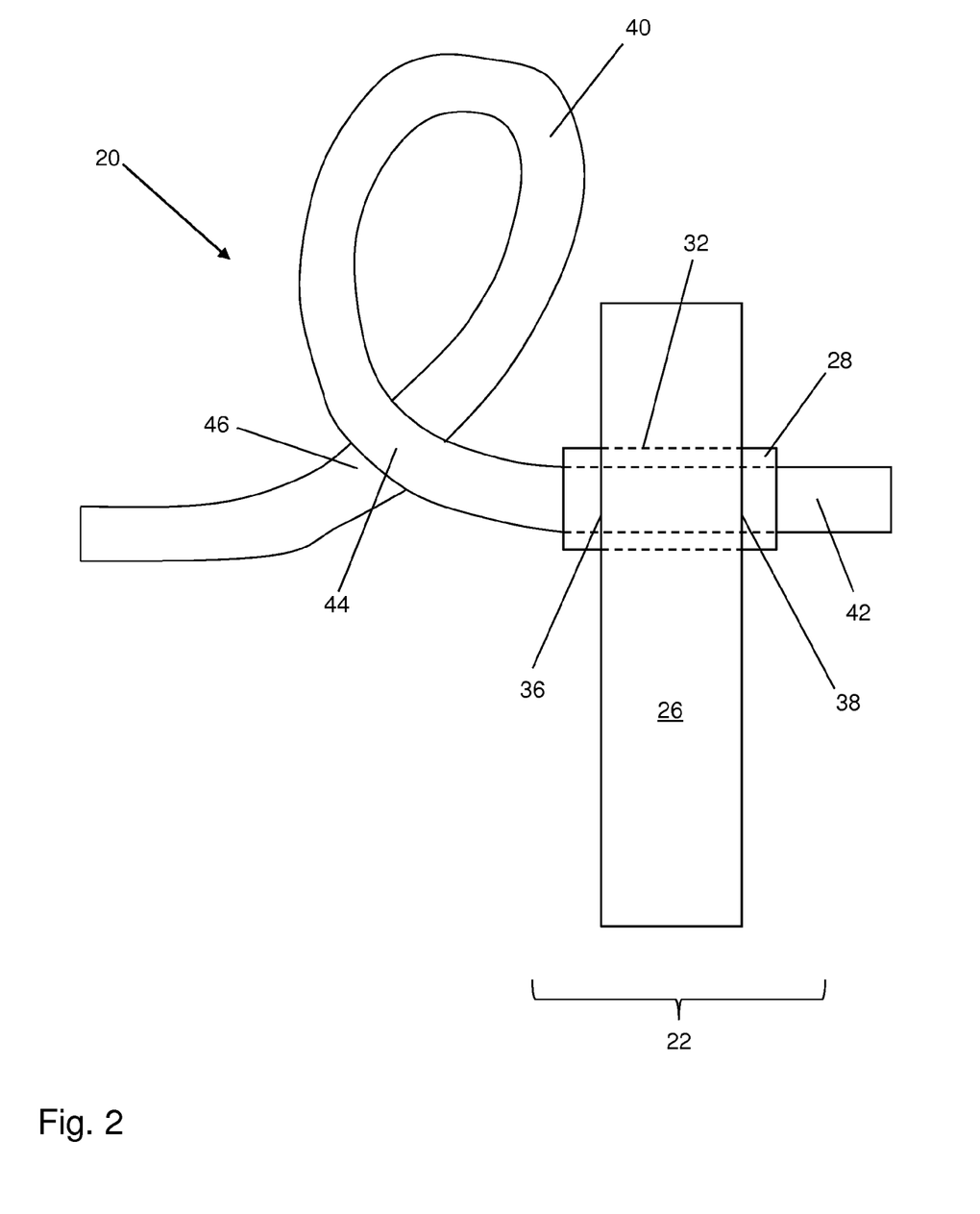
FIG. 2 is a front view of the fastening device of FIG. 1 being assembled.
Figure 3:
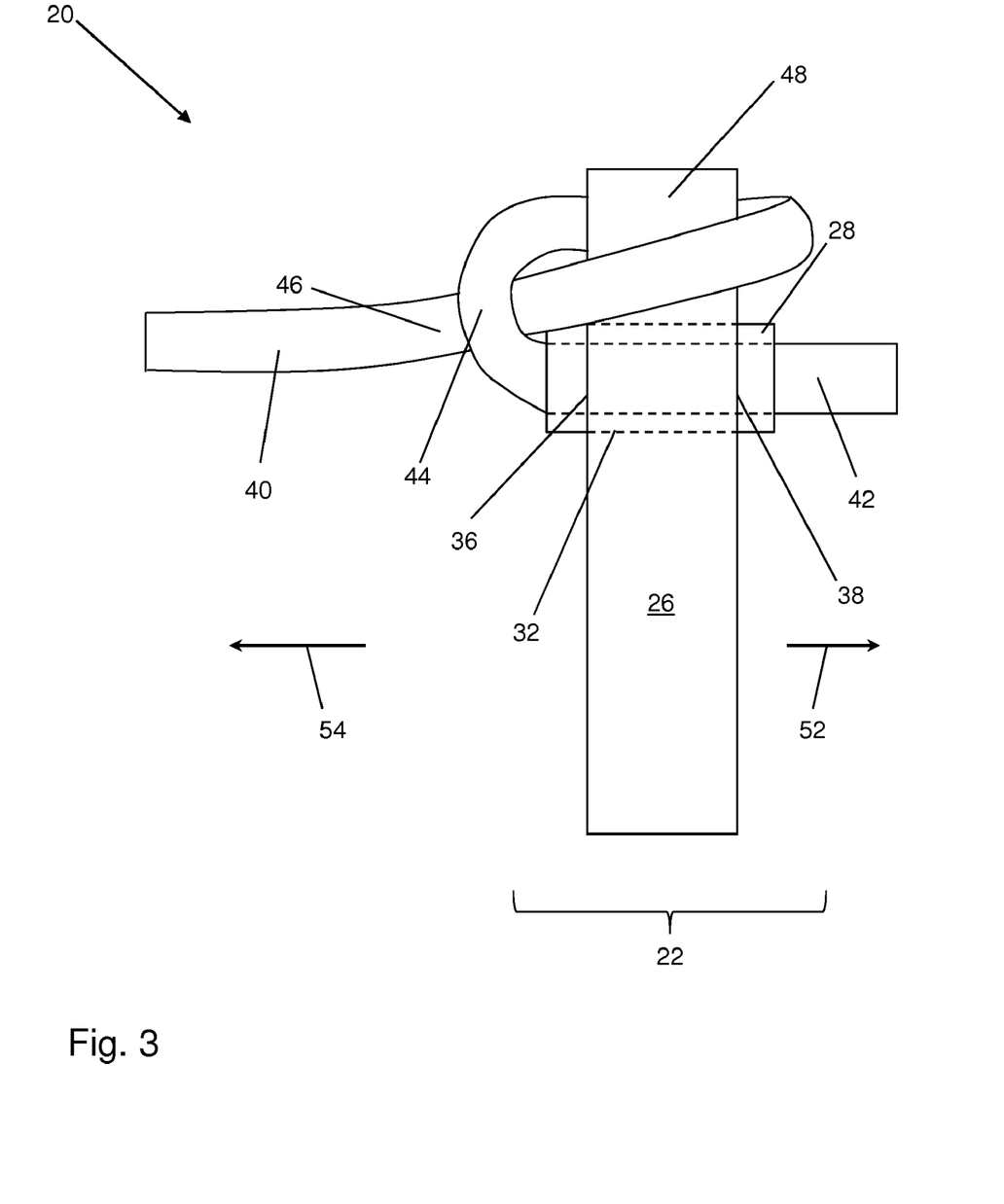
FIG. 3 is a front view of a fastening device of FIG. 1 fully assembled.

FIGS. 1-3 show the assembly of a fastening device 20. The fastening device includes a tube assembly 22 and a cord 24. The cord 24 may be any suitable type of line. Example cords 24 include ropes, cables, lines, twine, etc. The tube assembly includes a main tube 26 and a cord tube 28. The main tube 26 and the cord tube 28 may be made of plastic, composite, metal, or any another suitable material.

As seen in FIGS. 1-3, the main tube 26 defines a first axis 30 through hole 32. The through hole 32 defines a second axis 34. The second axis 34 passes through the first axis 30 and is substantially perpendicular to the first axis 30. By having second axis 34 pass through the first axis 30 tensional forces about the first axis 30 are reduced. The cord tube 28 is attached rigidly to the interior of the through hole 32.

The cord 24 is inserted into the cord tube 28. The through hole 32 defines a first opening 36 and a second opening 38. The cord 24 defines a cord first end 40 and a cord second end 42. The cord first end 40 corresponds to a portion of the cord 24 protruding from first opening 36 of the through hole 32. The cord second end 42 corresponds to a portion of the cord 24 protruding from the second opening 38.

As seen in FIG. 2, the first cord end 40 is formed into a loop such that a first segment 44 of the cord first end 40 overlaps a second segment 46 of the cord first end 40.

As seen in FIG. 3, the loop of the cord first end 40 is looped over a tube assembly first end 48 to complete assembly of the fastening device 20. When pulling the cord second end 42 in the direction 52, the first segment 44 of the cord first end 40 pinches the second segment 46 of the cord first end 40 against the tube assembly 22 to lock the cord 24 in place. When pulling the cord first end 40 in the direction 54, the cord 24 moves through the cord tube 28 in a direction from the second opening 38 to the first opening 36.

To increase holding power, the cord tube 28 extends beyond the through hole 32. The cord tube 28 defines a cord tube first end 76 and a cord tube second end 78. For optimal holding power, the cord tube first end 76 extends beyond the first opening 36 of the through hole 32 by approximately 30% of a diameter of the cord 24. However, extensions of up to 100% of the diameter of the cord also increase holding power.

In use, the fastening device 20 is used, for example to fasten a fender to a boat. The fender is attached to a rope 24 and is hung off the side of the boat. A tube assembly second end 50 of the tube assembly 22 is securely fastened to a rod holder on the boat. The free end of the rope 24 (i.e., the end not tied to the fender) is passed through a cord tube 28 from the side facing the load (i.e., fender). The rope 28 is drawn through the cord tube 28 until a desired working length remains. The rope 28 is then tied in a single loop around the main tube 26 just above or below the respective cord tube 28 so as to pinch the rope 24 at its exit from the cord tube 28 and is drawn safely tight from the side opposite the load.

After the boat fender is secured to the boat by way of the fastening device 20, it may be desirable to adjust the working length of the rope 24 (i.e., to change the length of rope 24 between the fender and the tube assembly 22). If a decrease in the working length of the rope 24 is required, the rope 24 may be drawn further through the cord tube 28 by pulling on the rope 24 from the side opposite the load thereby shortening the distance to the load. If an increase in the working length of the rope 24 is required, the loop may be loosened and the cord drawn through the cord tube 28 towards the load. In both examples of adjusting the working length of the rope 24, the fender (or other load) is securely fastened by a light pull on the free end of the rope 24 to tighten the loop.

Figure 4A:
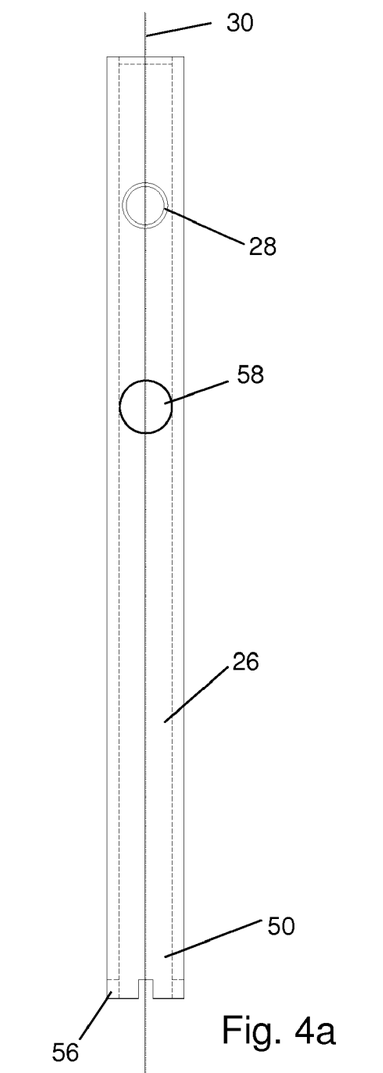
FIG. 4a is a side view of an embodiment of the tube assembly of FIG. 3.
Figure 4B:
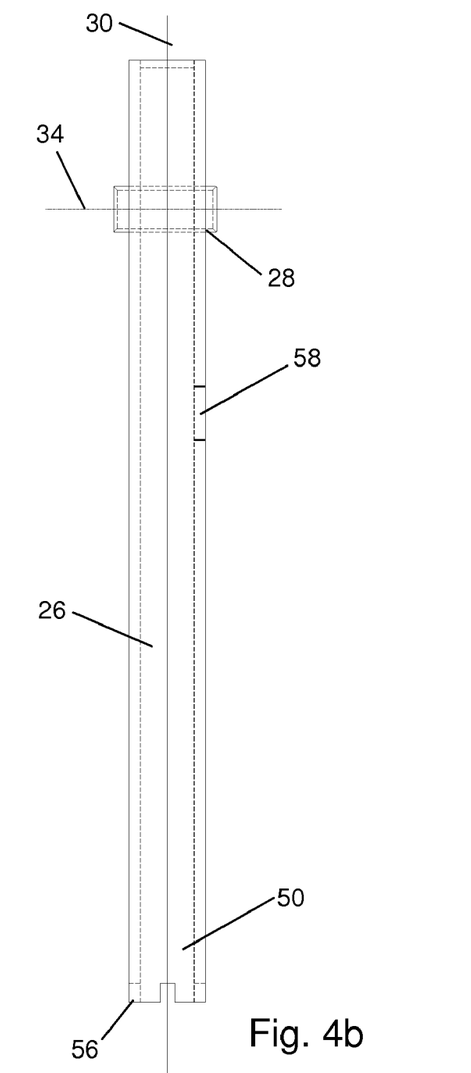
FIG. 4b is a front view of an embodiment of the tube assembly of FIG. 3.
Figure 4C:
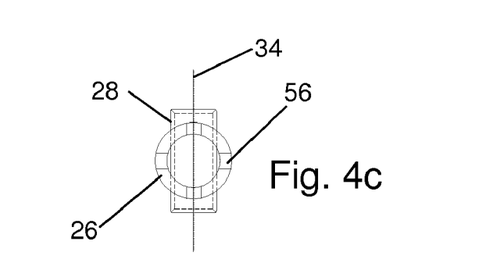
FIG. 4c is a bottom view of an embodiment of the tube assembly of FIG. 3.

FIGS. 4a-4c show an embodiment of the tube assembly 22. The tube assembly second end 50 is constructed and arranged to secure to an attachment device. For example, the set of notches 56 (i.e., one or more notches 56) are constructed and arranged to interface with a fishing rod holder. If the tube assembly 22 is to be attached to a different attachment device, other interfacing feature (comparable to the set of notches 56) may be used.

As seen in FIGS. 4a-4b, the tube assembly 22 includes a receiver hole 58 located below the first opening 36 of the main tube 26. The receiver hole 58 is used to hide or store the excess free length of the cord 24 (i.e., the cord first end 40) when the device 20 is in use.

Figure 5A:
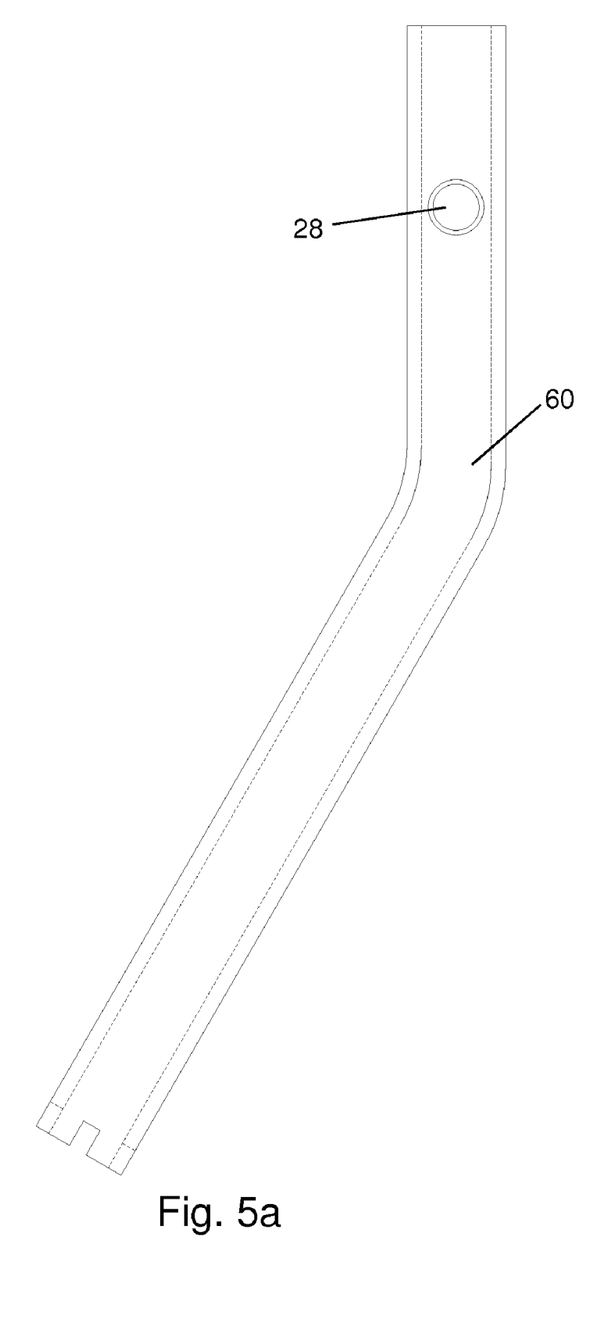
FIG. 5a is a side view of another embodiment of the tube assembly of FIG. 3.
Figure 5B:
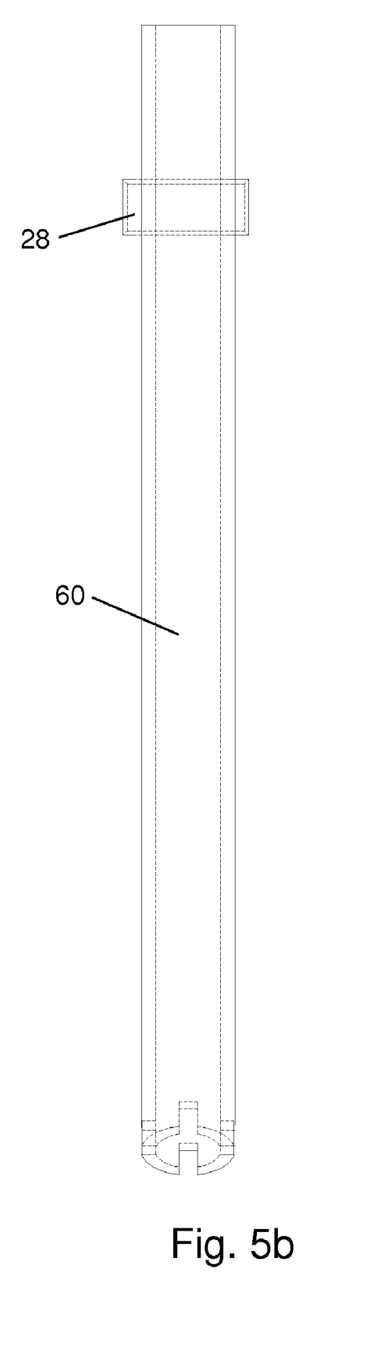
FIG. 5b is a front view of another embodiment of the tube assembly of FIG. 3.

FIGS. 5a-5b show another embodiment of the tube assembly 22. The tube assembly 22 includes a bent main tube 60. The bent main tube 60 is advantageous for mounting the tube assembly 22 to attaching devices that are not oriented at an optimal angle for attaching a straight main tube 26 and having it bear a load effectively. For example, if a rod holder is oriented at a thirty degree angle to the deck of a boat, inserting a bent main tube 60 having a thirty degree bend into the rod holder allows the top of the bent main tube 60 to be orthogonal to the deck. Such an orientation allows for optimal fastening conditions for loads parallel to the deck of the boat and minimizes chafing of the cord 24 for loads in this direction.

Figure 6A:
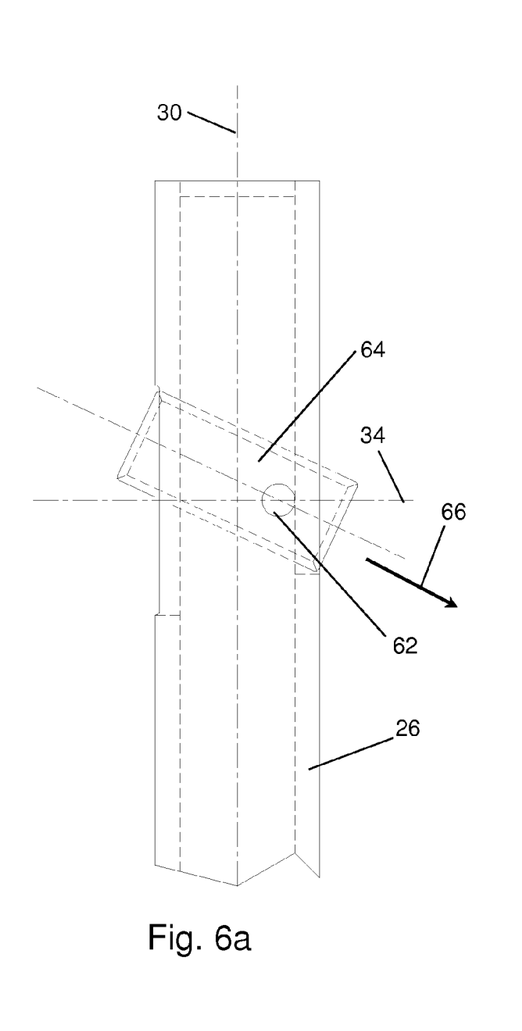
FIG. 6a is a side view of yet another embodiment of the tube assembly of FIG. 3.
Figure 6B:
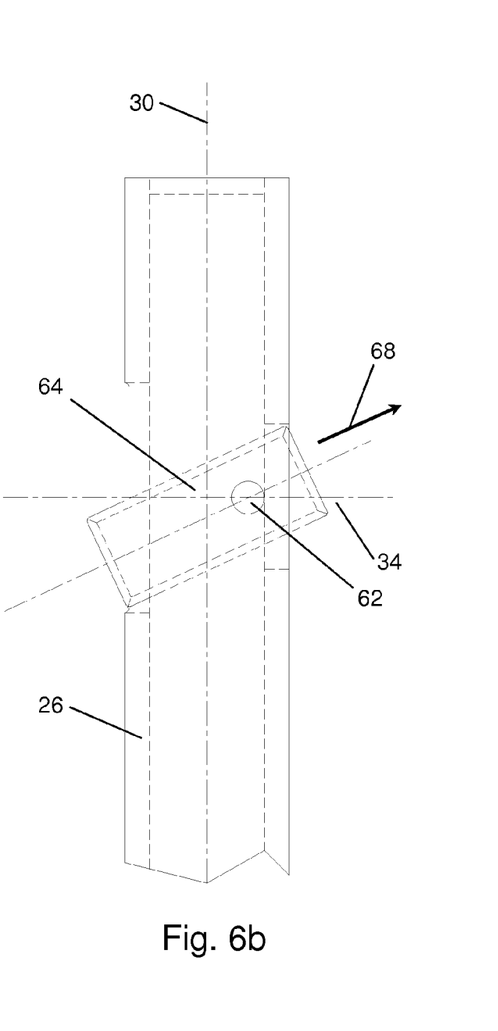
FIG. 6b is a side view of yet another embodiment of the tube assembly of FIG. 3.

FIGS. 6a-6b show another embodiment of the tube assembly 22. The tube assembly 22 includes a pin 62 to secure a pivotable cord tube 64 to the main tube 26. The pivotable cord tube 64 is constructed and arranged to pivot about the pin 62 and sweep through a plane defined by the first axis 30 and the second axis 34. The pivotable cord tube 64 allows the tube assembly to be self aligning so that the cord 24 orients the pivotable cord tube in the direction of the load. For example as seen in FIG. 6a, when the load is applied in direction 66, the pivotable cord tube 64 is aligned to match. When, as seen in FIG. 6b, the orientation of the load is altered to be in direction 68, the pivotable cord tube 64 self aligns to match this new load orientation. Self alignment helps to minimize chafing of the cord 24.

Figure 7:
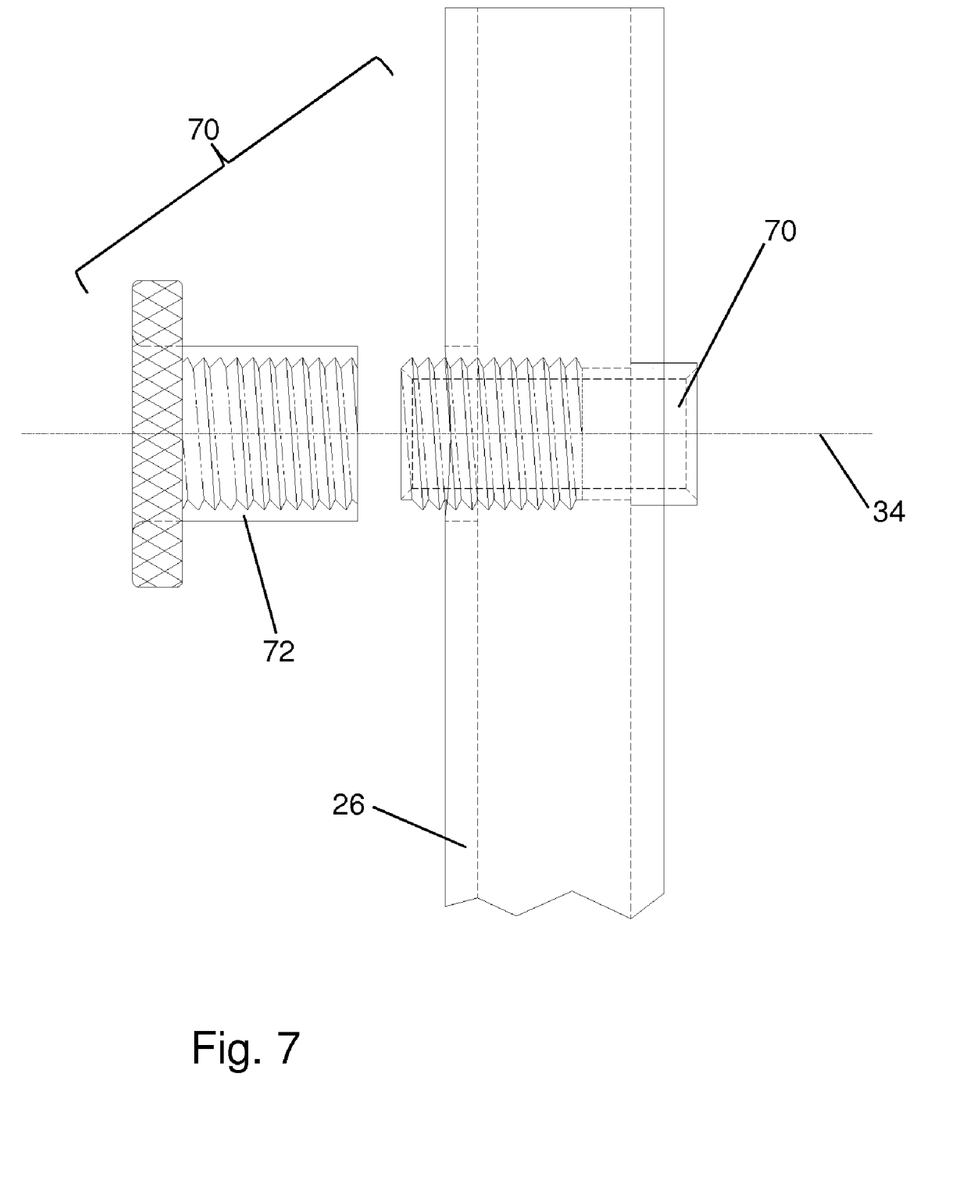
FIG. 7 is a side view of a further embodiment of the tube assembly of FIG. 3.

FIG. 7 shows yet another embodiment of the tube assembly 22. The tube assembly includes a cord tube 70. The cord tube 70 includes a cord tube first component 72 and a cord tube second component 74. The cord tube first component 72 screws onto the cord tube second component 74 through the main tube 26 which may be an existing tube or pipe on a structure such as a rail or stanchion. The overall length of the cord tube 70 changes with the degree to which the cord tube first component is screwed onto the cord tube second component. Since the holding power of the tube assembly is optimized when the cord tube first end 76 protrudes from the first opening 36 by approximately 30% the diameter of the cord 24, the adjustable length cord tube 70 allows a wide range of cord 24 thicknesses to be used with the tube assembly 22 while achieving optimal holding power.

Figure 8:
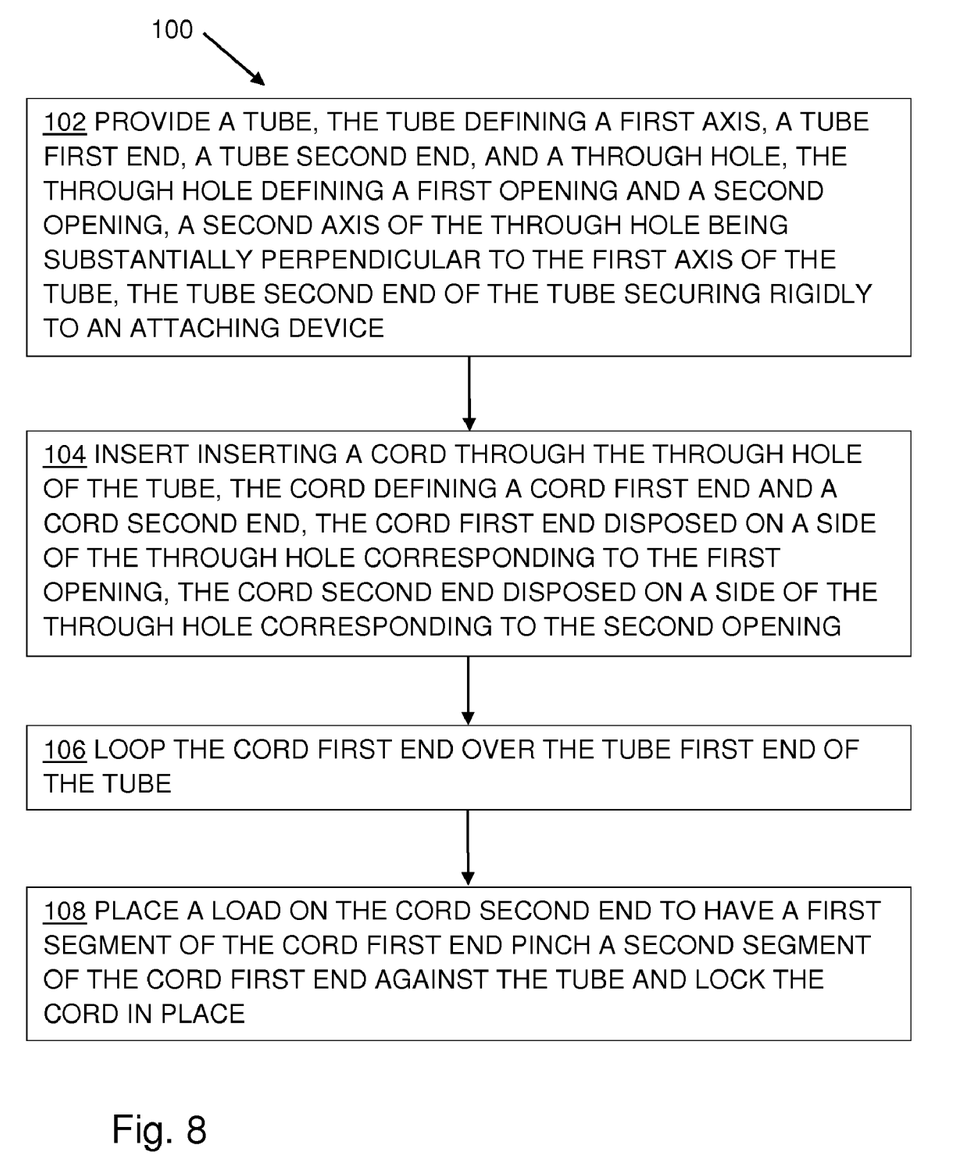
FIG. 8 is a flowchart showing a method of fastening.

FIG. 8 is a flowchart showing a method 100 for fastening.

Step 102 is to provide a tube 26, the tube 26 defining a first axis 30, a tube first end 48, a tube second end 50, and a through hole 32, the through hole 32 defining a first opening 36 and a second opening 38, a second axis 34 of the through hole 32 being substantially perpendicular to the first axis 30 of the tube 26, the tube second end 50 of the tube 26 securing rigidly to an attaching device.

Step 104 is to insert a cord 24 through the through hole 32 of the tube, the cord 24 defining a cord first end 40 and a cord second end 42, the cord first end 40 disposed on a side of the through hole 32 corresponding to the first opening 36, the cord second end 42 disposed on a side of the through hole 32 corresponding to the second opening 38.

Step 106 is to loop the cord first end 40 over the tube first end 48 of the tube 26.

Step 108 is to place a load on the cord second end 42 to have a first segment 44 of the cord first end 40 pinch a second segment 46 of the cord first end 40 against the tube 26 and lock the cord 24 in place.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

For example, while the fasting device 20 is described above as fastening things to a boat, the fastening device 20 may also be used to fasten things to a truck or trailer stake pocket or any other structure capable of holding the fastening device 20. Alternatively the fastening device 20 may be integrated into a part of an existing structure such as a rail, support, or stanchion through which the cord tube 28 could be mounted.

Additionally, while the fastening device 20 is describe above as utilizing the cord tube 28 to maximize holding power, the cord tube 28 may be omitted from the fastening device 20 and still provide a strong hold.

What is claimed is:

1. A fastening device comprising:
a tube defining a first axis, a tube first end, a tube second end, and a through hole, the through hole defining a first opening and a second opening, a second axis of the through hole being substantially perpendicular to the first axis of the tube, the tube second end of the tube securing rigidly to an attaching device, and
a cord inserted through the through hole, the cord defining a cord first end and a cord second end, the cord first end disposed on a side of the through hole corresponding to the first opening, the cord second end disposed on a side of the through hole corresponding to the second opening;
wherein the cord first end is looped over the tube first end of the tube;
wherein, when pulling from the cord second end, a first segment of the cord first end is constructed and arranged to pinch a second segment of the cord first end against the tube to lock the cord in place;
wherein, when pulling from the cord first end, the cord is constructed and arranged to move through the through hole in a direction from the second opening to the first opening.

2. The fastening device of claim 1:
wherein the tube is a main tube;
wherein further comprising a cord tube inserted into the through hole of the main tube, the cord tube having a cord tube first end extending out of the main tube through the first opening of the through hole and a cord tube second end extending out of the main tube through the second opening of the through hole.

3. The fastening device of claim 2:
wherein the cord defines a cord diameter;
wherein the cord tube first end extends beyond the first opening of the through hole by a distance between 20% and 40% of the cord diameter.

4. The fastening device of claim 2:
wherein the cord tube defines a cord tube length;
wherein the cord tube includes a cord tube first component and a cord tube second component, the cord tube first component constructed and arranged to screw into the second component;
wherein screwing the cord tube first component with respect to the cord tube second component changes the cord tube length.

5. The fastening device of claim 2:
further comprising a cord tube pin constructed and arranged to pivot the cord tube within the through hole of the main tube;
wherein the cord tube pivots about a third axis, the third axis being substantially perpendicular to the first axis and the second axis.

6. The fastening device of claim 1:
wherein the attaching device is a fishing rod holder of a boat;
wherein the second end of the tube includes a set of notches constructed and arranged to interface with the fishing rod holder.

7. The fastening device of claim 1:
wherein the attaching device is one of a fishing rod holder, a flange, receiver, and socket;
wherein the tube is bent to allow fastening through the through hole of the tube at an angular orientation different than an angular orientation of the attaching device.

8. A method for fastening comprising:
providing a tube, the tube defining a first axis, a tube first end, a tube second end, and a through hole, the through hole defining a first opening and a second opening, a second axis of the through hole being substantially perpendicular to the first axis of the tube, the tube second end of the tube securing rigidly to an attaching device;
inserting a cord through the through hole of the tube, the cord defining a cord first end and a cord second end, the cord first end disposed on a side of the through hole corresponding to the first opening, the cord second end disposed on a side of the through hole corresponding to the second opening;
looping the cord first end over the tube first end of the tube; and
placing a load on the cord second end to have a first segment of the cord first end pinch a second segment of the cord first end against the tube and lock the cord in place.

9. The method of claim 8:
wherein the tube is a main tube;
wherein a cord tube is inserted into the through hole of the main tube, the cord tube having a cord tube first end extending out of the main tube through the first opening of the through hole and a cord tube second end extending out of the main tube through the second opening of the through hole.

10. The method of claim 9:
wherein the cord defines a cord diameter;
wherein the cord tube first end extends beyond the first opening of the through hole by a distance between 20% and 40% of the cord diameter.

11. The method of claim 9:
wherein the cord tube defines a cord tube length;
wherein the cord tube includes a cord tube first component and a cord tube second component, the cord tube first component constructed and arranged to screw into the second component;
wherein screwing the cord tube first component with respect to the cord tube second component changes the cord tube length.

12. The method of claim 9:
further comprising a cord tube pin constructed and arranged to pivot the cord tube within the through hole of the main tube;
wherein the cord tube pivots about a third axis, the third axis being substantially perpendicular to the first axis and the second axis.

13. A kit for a manual fastening device for securing articles attached to a cord, the kit comprising:
a tube assembly comprising:
a main tube, having a main tube first end, a main tube second end, and a through hole positioned transversely to a longitudinal axis of the main tube and adjacent to the main tube first end, the through hole defining a first opening and a second opening, the main tube second end constructed and arranged to secure rigidly to an attaching device; and
a cord tube disposed within the through hole of the main tube, the cord tube having a cord tube first end extending transversely a predefined length out of the main tube through the first opening of the through hole, and configured for slidably receiving a cord through the cord tube and lacking structure within the cord tube that secures the cord within the cord tube, wherein the predefined length is between 20% and 100% of a diameter of a cord slidably received through the cord tube; and instructions for fastening a cord to the tube assembly of the manual fastening device, the instructions including:
inserting the cord through the cord tube disposed within the through hole of the main tube, the cord defining a cord first end and a cord second end, the cord first end disposed on a side of the through-hole corresponding to the first opening, the cord second end disposed on a side of the through hole corresponding to the second opening,
looping the cord first end over the tube first end of the main tube, and
placing a load on the cord second end to have a first segment of the cord first end pinch a second segment of the cord first end against the main tube and lock the cord in place.

14. The fastening device kit of claim 13:
further comprising a cord tube second end extending a predefined length out of the main tube through the second opening of the through hole, wherein the predefined length is between 20% and 100% of a diameter of a cord slidably received through the cord tube.

15. The fastening device kit of claim 14:
wherein the predefined length is between 20% and 40% of the diameter of the cord.

16. The fastening device kit of claim 14:
wherein the cord tube includes a cord tube first component and a cord tube second component, the cord tube first component constructed and arranged to screw into the second component.

17. The fastening device kit of claim 13:
further comprising a cord tube pin disposed to secure the cord tube to the main tube, wherein the cord tube in pivotably supports the cord tube within the through hole between a first position and a second position.

18. The fastening device kit of claim 13:
wherein the main tube second end includes a set of notches extending from the main tube second end a predefined distance parallel to the longitudinal axis of the main tube.

19. The fastening device kit of claim 13:
wherein the main tube has a bend positioned to locate the cord tube between the tube first end and the bend.

* * * * *